United States Patent

Plummer et al.

(10) Patent No.: US 9,633,146 B2
(45) Date of Patent: *Apr. 25, 2017

(54) SYSTEMS AND METHODS FOR ASSESSING PROPERTY DAMAGE

(71) Applicant: STATE FARM MUTUAL AUTOMOBILE INSURANCE COMPANY, Bloomington, IL (US)

(72) Inventors: Bryan Allen Plummer, Urbana, IL (US); Drew Cross, Geneseo, IL (US); Nathan L. Tofte, Downs, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/269,920

(22) Filed: May 5, 2014

(65) Prior Publication Data

US 2014/0278587 A1    Sep. 18, 2014

Related U.S. Application Data

(63) Continuation of application No. 14/047,844, filed on Oct. 7, 2013, now Pat. No. 8,756,085.
(Continued)

(51) Int. Cl.
*G06Q 40/00* (2012.01)
*G06F 17/50* (2006.01)
(Continued)

(52) U.S. Cl.
CPC ......... *G06F 17/5009* (2013.01); *G06Q 40/00* (2013.01); *G06Q 40/08* (2013.01);
(Continued)

(58) Field of Classification Search
CPC ........ G06Q 10/00; G06Q 20/00; G06Q 30/00; G06Q 40/00
(Continued)

(56) References Cited

U.S. PATENT DOCUMENTS 5,950,169 A    9/1999   Borghesi et al.
6,181,837 B1 *   1/2001   Cahill et al. .................. 382/305
(Continued)

OTHER PUBLICATIONS

Office Action in U.S. Appl. No. 13/647,098, dated Apr. 26, 2013.
(Continued)

*Primary Examiner* — Frantzy Poinvil
(74) *Attorney, Agent, or Firm* — Marshall, Gerstein & Borun LLP; Randall G. Rueth

(57) ABSTRACT

A damage assessment module operating on a computer system automatically evaluates a property, estimating damage to the property by analyzing a point cloud of a property. The damage assessment module identifies individual point clusters or segments from the point cloud and detects potentially damaged areas of the property surface by identifying outlier points in the point clusters. The damage assessment module may be used to determine the financial cost of the damage and/or determine whether the property should be replaced or repaired. In addition to eliminating the need for an estimator to visit the property in person, the damage assessment module improves the consistency and accuracy associated with estimating damage to a property.

14 Claims, 8 Drawing Sheets

Related U.S. Application Data

(60) Provisional application No. 61/799,452, filed on Mar. 15, 2013.

(51) Int. Cl.
   *G06Q 40/08* (2012.01)
   *G06T 7/00* (2017.01)
   *G06T 17/00* (2006.01)

(52) U.S. Cl.
   CPC .............. *G06T 7/00* (2013.01); *G06T 17/00* (2013.01); *G06T 2210/56* (2013.01)

(58) Field of Classification Search
   USPC ...................................................... 705/3–44
   See application file for complete search history.

(56) References Cited

U.S. PATENT DOCUMENTS

| | | |
|---|---|---|
| 6,574,377 B1 * | 6/2003 | Cahill et al. ................. 382/305 |
| 7,130,066 B1 * | 10/2006 | Kanematu ................... 358/1.15 |
| 7,752,286 B2 * | 7/2010 | Anderson et al. ............ 709/219 |
| 7,809,587 B2 | 10/2010 | Dorai et al. |
| 7,889,931 B2 | 2/2011 | Webb et al. |
| 7,953,615 B2 | 5/2011 | Aquila et al. |
| 7,984,500 B1 | 7/2011 | Khanna et al. |
| 8,265,963 B1 | 9/2012 | Hanson et al. |
| 8,284,194 B2 | 10/2012 | Zhang et al. |
| 8,370,373 B2 * | 2/2013 | Yamamoto ................... 707/758 |
| 8,374,957 B1 | 2/2013 | Garcia et al. |
| 8,510,196 B1 | 8/2013 | Brandmaier et al. |
| 8,527,305 B1 | 9/2013 | Hanson et al. |
| 8,537,338 B1 | 9/2013 | Medasani et al. |
| 8,543,486 B2 | 9/2013 | Donoho et al. |
| 8,651,206 B2 | 2/2014 | Slawinski et al. |
| 8,756,085 B1 | 6/2014 | Plummer et al. |
| 8,872,818 B2 | 10/2014 | Freeman et al. |
| 2003/0067461 A1 | 4/2003 | Fletcher et al. |
| 2003/0154111 A1 | 8/2003 | Dutra et al. |
| 2005/0007633 A1 * | 1/2005 | Kadowaki ................... 358/1.18 |
| 2005/0108065 A1 | 5/2005 | Dorfstatter |
| 2005/0144189 A1 * | 6/2005 | Edwards et al. ............. 707/102 |
| 2005/0276401 A1 | 12/2005 | Madill et al. |
| 2007/0050360 A1 * | 3/2007 | Hull et al. ........................ 707/6 |
| 2007/0179868 A1 | 8/2007 | Bozym |
| 2009/0028003 A1 | 1/2009 | Behm et al. |
| 2009/0119132 A1 | 5/2009 | Bolano et al. |
| 2009/0138290 A1 | 5/2009 | Holden |
| 2009/0148068 A1 | 6/2009 | Woodbeck |
| 2009/0265193 A1 | 10/2009 | Collins et al. |
| 2010/0094664 A1 | 4/2010 | Bush et al. |
| 2010/0104191 A1 | 4/2010 | McGwire |
| 2011/0187713 A1 | 8/2011 | Pershing et al. |
| 2011/0302091 A1 | 12/2011 | Hornedo |
| 2012/0013617 A1 | 1/2012 | Zhang et al. |
| 2012/0076437 A1 | 3/2012 | King |
| 2012/0179431 A1 | 7/2012 | Labrie et al. |
| 2013/0051639 A1 | 2/2013 | Woodford et al. |
| 2013/0262153 A1 | 10/2013 | Collins et al. |
| 2013/0321393 A1 | 12/2013 | Winder |
| 2014/0100889 A1 | 4/2014 | Tofte |
| 2014/0226182 A1 * | 8/2014 | Lee et al. ..................... 358/1.15 |
| 2014/0270492 A1 | 9/2014 | Christopulos et al. |
| 2014/0278587 A1 | 9/2014 | Plummer et al. |
| 2014/0324405 A1 | 10/2014 | Plummer et al. |

OTHER PUBLICATIONS

Office Action in U.S. Appl. No. 13/647,098, dated Nov. 1, 2013.
U.S. Appl. No. 13/647,098, filed Oct. 8, 2012.
U.S. Appl. No. 13/836,695, filed Mar. 15, 2013.
U.S. Appl. No. 13/839,634, filed Mar. 15, 2013.
U.S. Appl. No. 14/047,873, filed Oct. 7, 2013.
U.S. Appl. No. 13/804,984, filed Mar. 14, 2013.
U.S. Appl. No. 13/893,904, filed May 14, 2013.
UTC Spotlight: Superstorm Sandy LiDAR Damage Assessment to Change Disaster Recovery, Feb. 2013.
Woodbeck et al., "Visual cortex on the GPU: Biologically inspired classifier and feature descriptor for rapid recognition," IEEE Computer Society Conference on Computer Vision and Pattern Recognition Workshops 2008, pp. 1-8 (2008).
Final Office Action for U.S. Appl. No. 13/836,695, dated Feb. 25, 2014.
Final Office Action for U.S. Appl. No. 13/839,634 dated Mar. 21, 2014.
Final Office Action, U.S. Appl. No. 13/647,098, dated Oct. 9, 2014.
Nonfinal Office Action, U.S. Appl. No. 13/647,098, dated Mar. 14, 2014.
Nonfinal Office Action, U.S. Appl. No. 13/839,634, dated Aug. 5, 2014.
Nonfinal Office Action, U.S. Appl. No. 14/318,521, dated Oct. 10, 2014.
Nonfinal Office Action, U.S. Appl. No. 14/323,626, dated Sep. 17, 2014.
Office Action for U.S. Appl. No. 13/839,634, dated Oct. 25, 2013.
Office Action in U.S. Appl. No. 13/836,695, dated Oct. 3, 2013.
U.S. Appl. No. 14/047,844, filed Oct. 7, 2013.
U.S. Appl. No. 14/269,920, filed May 5, 2014.

\* cited by examiner ental Application No. 61/799,452, filed Mar. 15, 2013, and
SYSTEMS AND METHODS FOR ASSESSING PROPERTY DAMAGE

CROSS-REFERENCE TO RELATED APPLICATIONS

This application is a continuation of U.S. application Ser. No. 14/047,844, filed Oct. 7, 2013, now U.S. Pat. No. 8,756,085 entitled "Systems and Methods for Assessing Property Damage," which claims the benefit of U.S. Provisional Application No. 61/799,452, filed Mar. 15, 2013, and titled "System and Method of Assessing Hail Damage," the disclosures of which are incorporated herein by reference.

FIELD OF THE DISCLOSURE

This disclosure relates to systems and methods for assessing property damage for insurance companies.

BACKGROUND

Insurance companies exhaust considerable resources estimating damage caused to property. When a claim has been reported on an insured property, the insurance company will generally send a representative to the site of the property to inspect the property and assess the damage. The representative typically identifies damage by visually inspecting the property and looking for signs of distress to the property. For example, the representative may look for indents on the surface of the property when assessing hail damage or missing shingles/siding when assessing wind damage to a building. Once damage has been identified, the representative assesses the damage by estimating how much it will cost to repair or replace the damaged property. The insurance company then issues payment to the insurance policy holder based on the estimated cost.

Generally speaking, representatives rely on a subjective inspection and assessment of the property. While representatives may use specialized tools in certain circumstances (e.g., using an infrared camera to detect water damage), the approach utilized for inspections and assessments tends to vary from one representative to the next. This especially holds true with regard to inexperienced representatives, who often do not have a good eye, relative to more experienced representatives, for identifying and assessing damage. Moreover, regardless of experience level, representatives risk overlooking relevant damage (especially damage that has resulted in subtle visual defects) or failing to document all relevant damage. Inconsistency is further exacerbated by environmental conditions that make inspection and assessment especially difficult. For example, irregular lighting conditions and various material types used for the property may make it difficult, even for an experienced representative, to accurately identify and assess damage to the property. In short, results from current assessment techniques tend to be inconsistent and unreliable.

In addition to providing inadequate results, a subjective inspection/assessment may expose a representative to dangerous conditions. For example, the representative exposes himself or herself to the risk of falling when assessing roof damage. Windy or rainy conditions, which are common in many locales, enhance this risk.

SUMMARY

A system and method for estimating property damage provides an analytical approach that is repeatable and consistent, regardless of who is doing the estimation. The systems and methods may be automated, removing the subjectivity of a person doing the estimation and helping new and inexperienced estimators produce consistent results regardless of the level of training and experience of the estimator.

A system and method for estimating damage to a property includes scanning a property with a 3D scanner to generate a first point cloud representing at least part of the property, wherein said property is selected from the group consisting of: (i) a building, and (ii) a vehicle. The first point cloud may be stored to a memory communicatively connected to the 3D scanner. The system and method may further comprising causing one or more processors, at least one of which is communicatively connected to the memory, to isolate a plurality of segments from the first point cloud, each segment corresponding to one of a plurality of objects detectable at the surface of the property, the plurality of segments including a first segment corresponding to a first object detectable at the surface of the property. A model point cloud representing an average of a plurality of point cluster may be generated. The one or more processors may compare the first segment to the model point cloud, wherein said compare comprises: identifying a first point in the first segment, determining a first coordinate position of the first point, identifying a second point in the model point cloud, wherein the second point is closer to the first coordinate position than any other point in the model point cloud, determining a second coordinate position of the second point, determining a distance between the second coordinate position and the first coordinate position, and determining whether the first point is an outlier point based on the determined distance. The one or more processors may identify, based at least in part on the comparison of the first segment to the model point cloud, a set of outlier points forming a first point cluster and associate the set of outlier points to a damage status. Then, the one or more processors may generate a display providing information identifying potential damage to the property based at least in part on the damage status.

A system and method for determining whether an object is damaged beyond expected wear and tear may include scanning a group of two or more objects with one or more 3D scanners to generate a group of two or more point clusters, the group of two or more point clusters including a first point cluster representing the first object and a second point cluster representing the second object, wherein the first object and the second object are each components of: (i) a building, or (ii) a vehicle. The system and method may further include storing the group of two or more point clusters to a memory communicatively connected to the one or more 3D scanners. One or more processors communicatively connected to the memory may generate a model point cloud including at least one point from each of the two or more point clusters in the group. The one or more processors may then identify: a first nearest-neighbor distance between a first point in the model point cloud and a second point in the model point cloud, the second point being closer to the first point than any other point in the model point cloud; and a second nearest-neighbor distance between a third point in the model point cloud and a fourth point in the model point cloud, the fourth point being closer to the third point than any other point in the model point cloud. Then, a threshold nearest-neighbor may be calculated distance based on an average nearest-neighbor distance, the average nearest-neighbor distance determined, at least in part, based on the first nearest-neighbor distance and the second nearest-neighbor distance. The one or more processors may compare the first point cluster to the model point cloud, wherein said compare comprises determining a third nearest-neighbor distance for a particular point in the first point cluster, the third nearest-neighbor distance being between the particular point in the first point cluster and a nearest point in the model point cloud that is nearest, relative to other points in the model point cloud, to the particular point in the first point cluster. The one or more processors may then determine whether the particular point represents a point of potential damage to the first object, exceeding expected wear and tear, by comparing the third nearest-neighbor distance to the threshold nearest-neighbor distance. Finally, the one or more processors may generate a display indicating that the first object is potentially damaged beyond expected wear and tear when it is determined that the particular point represents a point of potential damage to the first object exceeding expected wear and tear.

DETAILED DESCRIPTION

A damage assessment module operating on a computer system automatically evaluates a property, estimating damage to the property by analyzing a point cloud. Based on the analysis, the damage assessment module generates a display including information about the property damage. The generated display may be used to determine the financial cost of the damage and/or determine whether the property should be replaced or repaired. The damage assessment module eliminates the need for a human representative to travel to the physical site where the property is located. This is especially beneficial for evaluating a roof, where the damage assessment module eliminates the need for an estimator to climb onto a roof for evaluation purposes. The damage assessment module also improves the consistency and accuracy associated with estimating damage to a property. While environmental factors, such as poor lighting, can negatively affect the consistency and reliability of current damage assessment techniques, the damage assessment module greatly reduces the significance of such factors. Because the damage assessment module relies on an objective analysis based on a detailed point cloud rather than a subjective opinion of a human representative relying on a visual inspection of the property, the damage assessment module enables a high level of consistency and reliability with regard to estimating damage to a property. Finally, due to the automated nature of the damage assessment module and the objective analysis implemented by the damage assessment module, human representatives will be capable of using the damage assessment module to produce high quality assessment results, regardless of the level of training or experience.

System Overview

Figure 1:
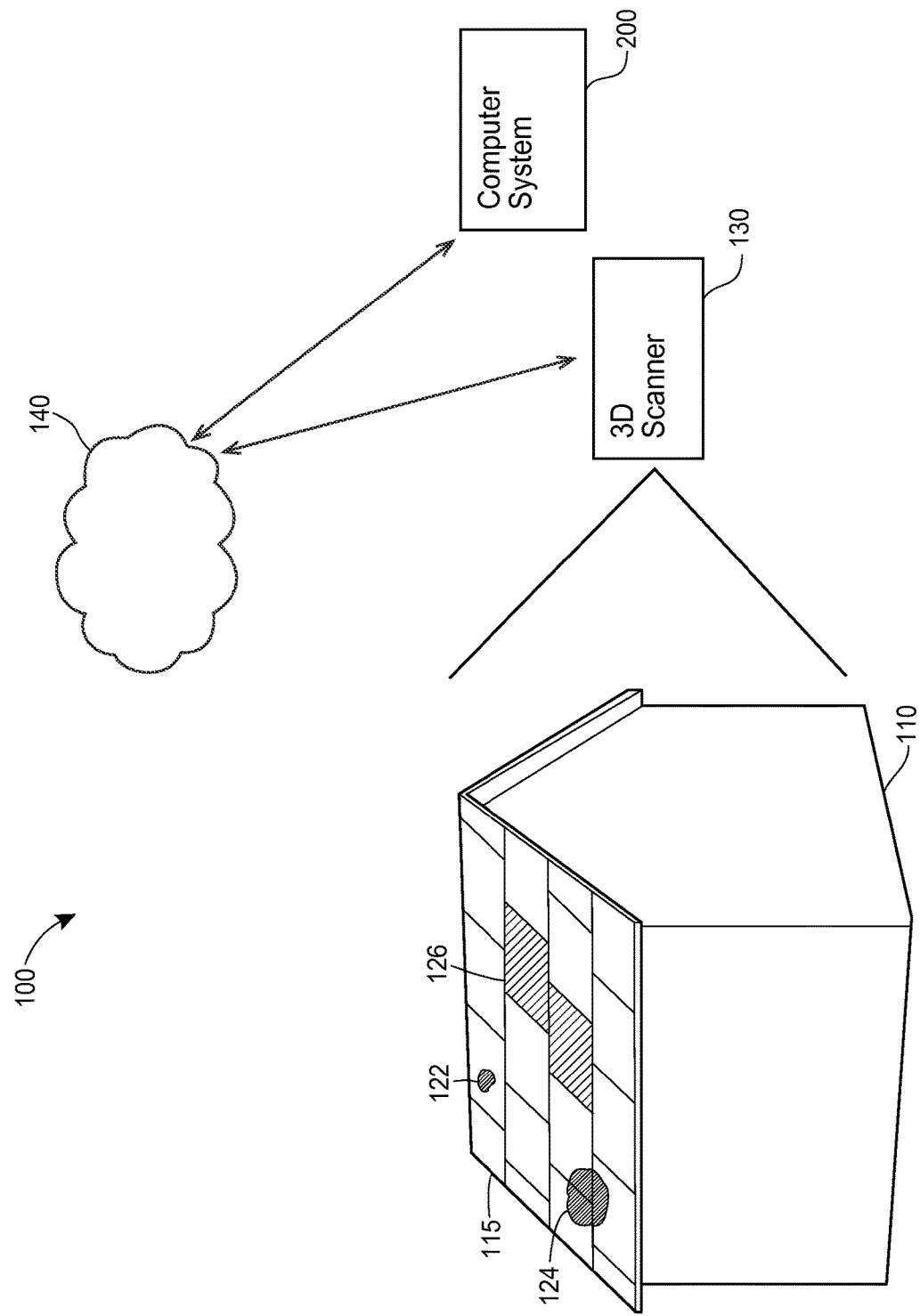
FIG. 1 illustrates a block diagram of an example system including a computer system for evaluating a property of a structure in accordance with the described embodiments.

FIG. 1 illustrates a block diagram of an example system 100 including a computer system 200 for evaluating a roof 115 of a property 110 in accordance with the described embodiments. The roof 115 includes potential areas of damage 122, 124, and 126.

The example system 100 includes a 3D scanner 130 configured to scan an object and generate a point cloud. The 3D scanner 130 may implement any of a number of techniques to scan an object, including, for example, time-of-flight techniques or triangulation techniques. The 3D scanner 130 may implement systems utilizing laser, white light, audio, infrared, or any other technology suitable for scanning the roof 115.

In operation, the 3D scanner 130 generates a point cloud or cluster based on a scan of the property 110 and transmits the point cloud via a network 140. The computer system 200 receives the point cloud via the network 140, storing the point cloud to memory. The computer system 200 then estimates damage to the property 110 by analyzing the point cloud. For example, the computer system may identify points corresponding to the damaged areas 122, 124, and 126. After estimating the location and/or extent of damage to the property 110, the computer system 200 may generate a report of the damage. The report may be a file or dataset saved to memory. The computer system 200 may also provide a display containing information related to the estimated location and/or extent of damage. In some embodiments the 3D scanner 130 only scans part of the property 110. For example, in some circumstances the 3D scanner 130 may only scan the roof 115 or part of the roof 115.

In some embodiments, the computer system 200 may receive the point cloud from another device or system. For example, the computer system 200 may receive the point cloud from a computer system such as a server. The computer system 200 may also receive the point cloud from a storage device connected to the computer system 200 (such as a USB device or an SD card, for example).

Figure 2:
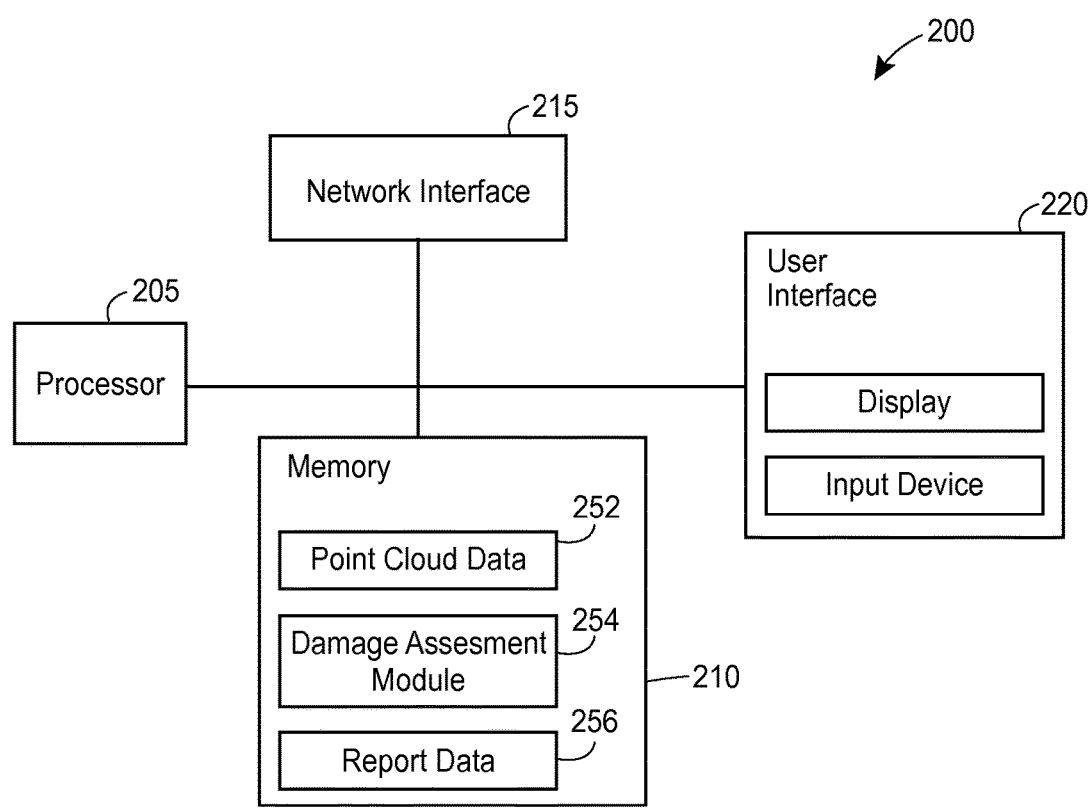
FIG. 2 illustrates a block diagram of an example computer system on which a method for evaluating a property may operate in accordance with the described embodiments.

FIG. 2 illustrates a block diagram of an example computer system 200 on which a method for evaluating a property may operate in accordance with the described embodiments. The computer system 200 may take the form of any general purpose or special purpose computer or computing device. For example, the computer system 200 may be a personal computer, server, laptop, tablet, a set-top box, a multiprocessor system, a microprocessor system, or any other type of computer. Further, the computer system 200 may be a distributed computing environment including multiple computing devices.

The computer system 200 includes one or more processors 205, a computer-readable memory 210, a network interface 215, a user interface 220, and a system bus 250. The processor 205 communicates with the other components of the computer 200 via the system bus 250. The processor 205 is configured to fetch and execute instructions stored at the memory 210.

The network interface 215 is configured to establish communication via a network and may include an antenna, a port for wired connection, a connection to a modem, a connection to a router, or some combination thereof. The User Interface (UI) 210 includes a display 262 and an input device 264 in this example. Generally speaking, the UI 210 may include any suitable input or output devices, such as a touchscreen, a keyboard, a mouse and/or speakers. In some embodiments, some or all of the UI 210 may be remotely located relative to the other components of the computer system 200 and the UI 210 may communicate with the components of the computer system 200 via the network interface 215.

The memory 210 is configured to store data, including instruction sets making up one or more services or programs and any data operated on or produced by such services or programs. The memory 210 may include volatile (e.g., RAM) and/or non-volatile memory (e.g., a harddisk) and may be removable or non-removable memory. More particularly, the memory 210 includes point cloud data 252, a damage assessment module 254, and report data 256. The point cloud data 252 includes one or more point clouds representing a surface of a structure, property and/or shingle, each point cloud being a set of data points in a three-dimensional coordinate system. The point cloud data 252 may include point clouds used as input for the damage assessment module 254, as well as point clouds generated or modified by the damage assessment module 254. Each data point in a point cloud corresponds to a particular point on the surface of the structure/property/shingle. As discussed further below, the damage assessment module 254 is a program for estimating damage to a property. The report data 256 is generated in response to the estimation performed by the damage assessment module 254. The report data may be produced by the damage assessment module 254 or by a reporting module (not shown).

The processor 205 may perform the methods or operations described herein. In some instances, performance of certain parts of the methods or operations described herein may be distributed among one or more processors residing across a plurality of machines. The one or more processors may share a similar geographic location in some instances (e.g., a server farm), or may be distributed across a number of geographically distinct areas. Moreover, the one or more processors may operate to support performance of relevant operations in a "cloud computing" environment. For example, at least some of the operations may be performed by a group of computers or by the previously described plurality of machines, wherein the operations are accessible via a network (accessible by, e.g., the network interface 215).

In operation, the computer system 200 receives point cloud data at the network interface 215 (via, e.g., the network 140 shown in FIG. 1). Alternatively, the point cloud data 252 may be received at the UI 210 or at a peripheral device interface (not shown), such as a Universal Serial Bus (USB) interface. In any event, the received point cloud data is stored as at least part of the point cloud data 252 at the memory 210. Any type of communication protocol may be implemented at the computer system 200 for receiving the point cloud data. For example, in some embodiments the computer system 200 receives the point cloud data 252 via a transfer initiated by another system, while in other embodiments the computer system 200 requests the point cloud data 252 from another system, resulting in the other system transferring the point cloud data 252 to the computer system 200.

In further operation, the processor 205 executes the damage assessment module 254 to estimate damage to a property by analyzing a point cloud representing a property or a part of the property. As discussed in further detail below, estimating damage to the property may include: (i) identifying/isolating individual segments (i.e., point clusters) within the point cloud, where the segments correspond to objects that are components of the property or objects on a surface of the property (e.g., the objects may be shingles on a roof, bricks in a wall, siding panels, tiles on a floor, body panels of a vehicle such as an automobile/boat/airplane, etc.), (ii) identifying points of potential damage to one or more of the objects, and (iii) determining which areas of the property are damaged based on the identified points of potential damage to the objects.

Finally, the computer system 200 may generate a report of the estimated damage to the property and save the report to the memory 210 as at least part of the report data 256. The report may include information pertaining to the location of the damaged areas on the property, as well as the extent of damage to the property. The report may be a file or data set including information pertaining to some or all of the estimated damage to the property. Furthermore, the report may enable various textual or graphical representations of the estimated damage to be generated (e.g., images, video, diagrams, charts, text, etc.). For example, in some embodiments an output may be provided at the display 262 (such as a television or computer monitor) based on the report. In other instances, a printer (not shown) may print one or more documents based on the report. The printer may be connected to a peripheral device interface at the computer system 200 (not shown), or may be in network communication with the computer system 200 via the network interface 215. In still other instances, the report may be saved as a file and transferred to another system (via, e.g., the network interface 215).

Figure 3:
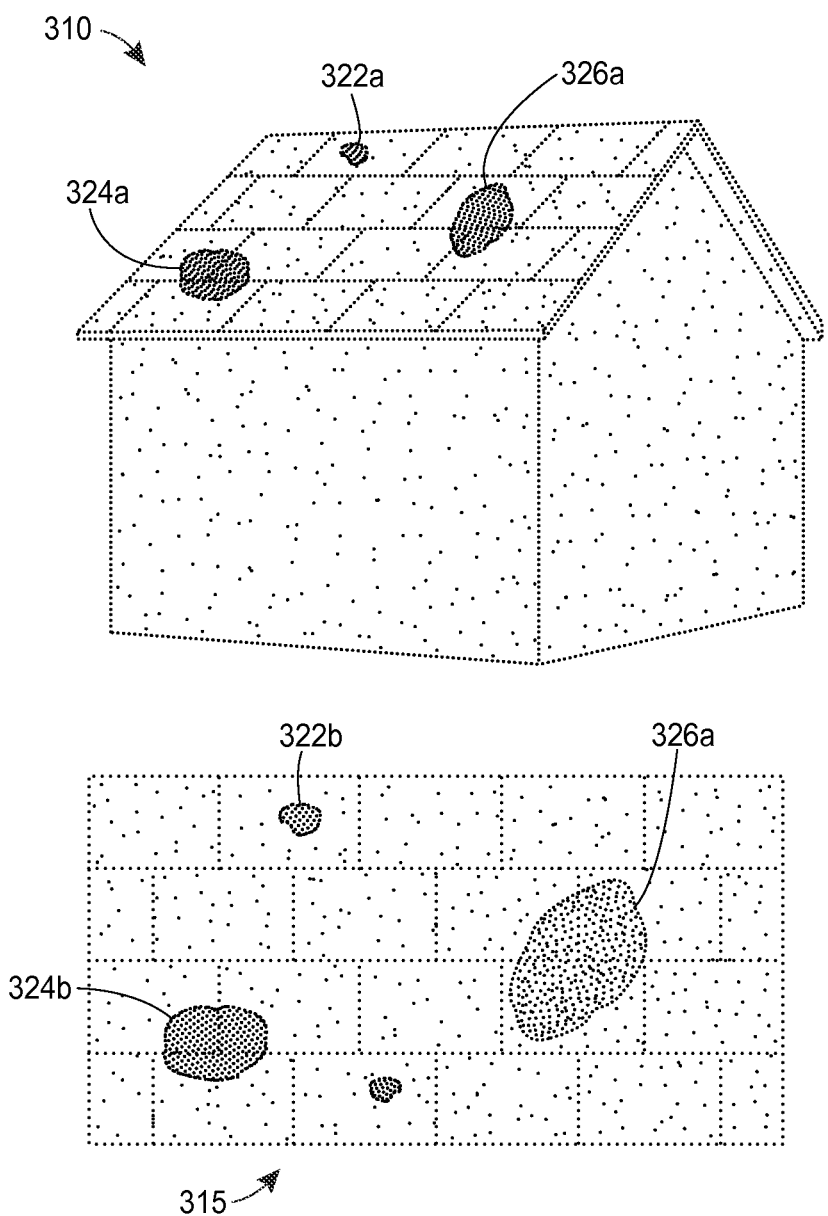
FIG. 3 illustrates an example point cloud of a property and an example point cloud of a roof in accordance with the described embodiments.

FIG. 3 illustrates an example point cloud 310 of the property 110 and an example point cloud 315 of the roof 115 in accordance with the described embodiments. The point cloud 310 includes areas 322*a*, 324*a*, and 326*a* of potential damage. The point cloud 315 includes areas 322*b*, 324*b*, and 326*b* of potential damage.

The point cloud 310 may be received and stored at a computer system (such as the computer system 200 shown in FIG. 2). The computer system may identify the points from the point cloud 310 corresponding to the roof 115 by identifying features associated with the roof 115. For example, shingles, which are typically only found on a roof of a building, generally have a distinct shape and pattern in comparison to the rest of the building. Thus, the computer system may identify points corresponding to shingles on the roof 115 based on the shapes of the shingles. The computer system may then generate the point cloud 315 based on the identified points. In some embodiments, the computer system may receive the point cloud 315 from a second system rather than generating the point cloud 315 from the point cloud 310. For example, the computer system may receive the point cloud 315 from a 3D scanner, a second computer device, a network device on a network, etc.

As discussed further below, the computer system may identify one or more individual shingles represented in the point cloud 315. In some instances, the computer system may generate a point cloud corresponding to each shingle (shingle point cloud). The shingle point clouds may be analyzed to identify points representing potential areas of damage to the shingle. In some instances, points identified as potential damage may then be mapped to a point cloud representing the property and/or roof associated with the shingles (such as the original point cloud from which the shingle point clouds were identified). Using the points identified as potential damage, the computer system may identify groups or clusters of potential damage to identify areas of the property having physical features consistent with property damage.

In other embodiments, the computer system may identify one or more individual bricks, tiles, siding panels, wood planks, or any other detectable objects on the surface of the property. The computer system may generate a point cloud or cluster (i.e., a "segment") corresponding to each respective object (brick/tile/siding panel/plank/etc.) The segments may be analyzed to identify points representing potential areas of damage to the object. The computer system may then identify groups or clusters of potential damage to identify areas of the property having physical features consistent with property damage.

Example Methods for Estimating Damage to a Property Based on a Point Cloud

Figure 4A:
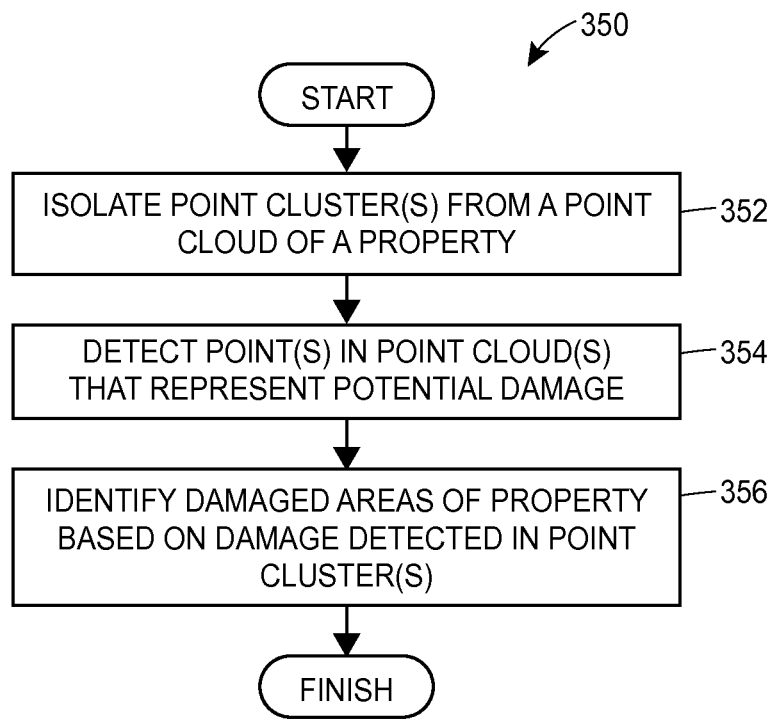
FIG. 4a illustrates an example method for estimating damage to a property in accordance with the described embodiments.

FIG. 4a illustrates an example method 350 for estimating damage to a property in accordance with the described embodiments. The method 350 may be implemented, in whole or in part, on one or more devices or systems such as the computer system 200 of FIG. 2. The method 350 may be saved as a set of instructions, routines, programs, or modules on memory such as the memory 210 shown in FIG. 2. In particular, the method 350 may be saved as at least part of the damage assessment module 254 shown in FIG. 2.

The method 350 begins when a computer system isolates one or more point clusters (segments) from a point cloud of a property or a part of a property (block 352). Each of the point clusters may represent a detectable object on the surface of the property or a component of the property. For example, the objects may be roof shingles, bricks, floor/wall tiles, wall panels, wood planks, body panels, etc. By identifying individual objects on the surface of the property, the computer system may identify areas of potential damage to individual objects, allowing the computer system to estimate damage to the property as a whole.

After isolating the point clusters, the computer system determines which points in each of the point clusters, if any, represent points of potential damage to the objects (damaged points) (block 354). In typical embodiments, the computer system detects damaged points by comparing each of the point clusters to a model point cloud. The model point cloud generally represents an undamaged object, though it may have characteristics consistent with normal wear and tear. Thus, for example, a point cluster may be superimposed on the model point cloud and points corresponding to undamaged areas of the object will be near one or more points in the model point cloud. Points corresponding to damaged areas of the object, on the other hand, will tend to be further away from points in the model point cloud. Consequently, outlier points in each of the point clusters may be identified as damaged points.

After detecting the damaged points by comparing each of the point clusters to a model point cloud, the computer system may map the damaged points to the property point cloud and identify clusters of damaged points to estimate which areas of the property are damaged (block 356). In some embodiments, the computer system determines which, if any, of the identified clusters of damaged points represent a false positive. The computer system may also, in certain circumstances, identify an extent or severity of the damage associated with each cluster.

Figure 4B:
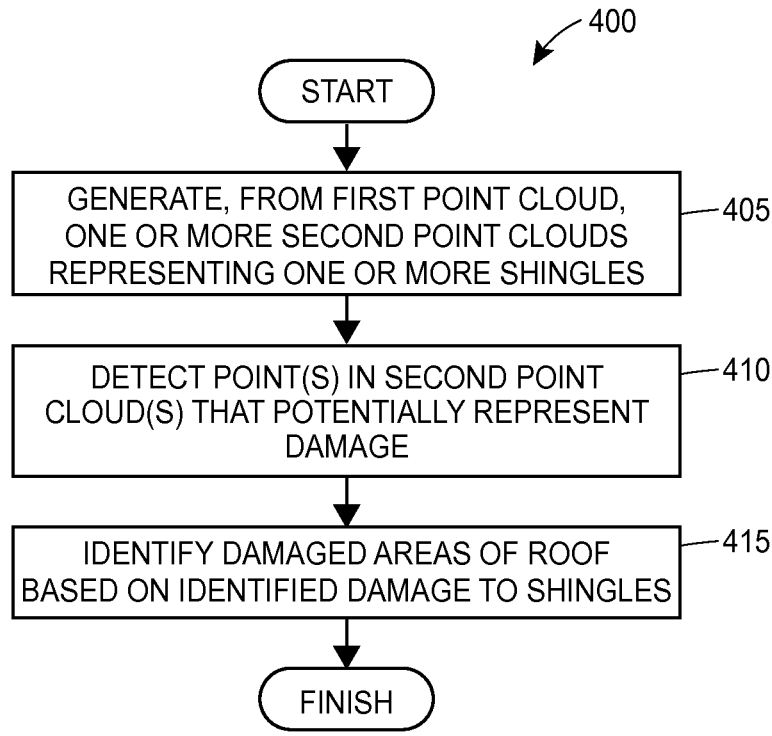
FIG. 4b illustrates an example method for estimating damage to a property in accordance with the described embodiments.

FIG. 4b illustrates an example method 400 for estimating damage to a property having a roof in accordance with the described embodiments. The method 400 may be implemented, in whole or in part, on one or more devices or systems such as the computer system 200 of FIG. 2. The method 400 may be saved as a set of instructions, routines, programs, or modules on memory such as the memory 210 shown in FIG. 2. In particular, the method 400 may be saved as at least part of the damage assessment module 254 shown in FIG. 2. In particular, the method 400 may be saved as at least part of the damage assessment module 254 shown in FIG. 2.

The method 400 begins when a computer system generates, based on a point cloud of a roof (roof point cloud), point clouds representing individual shingles (shingle point cloud) (block 405). By identifying individual shingles (i.e., shingle segmentation) on the property, the computer system may identify areas of potential damage to individual shingles, allowing the computer system to estimate damage to the property as a whole. Identifying damage to particular shingles may be simpler than identifying damage to the property as a whole because shingles tend to have consistent and predictable physical characteristics, such as shape and size. Consequently, as described below, shingles may offer the benefit of having a reliable reference model to which they may be compared.

After generating the shingle point clouds, the computer system detects which points in each of the shingle point clouds, if any, represent points of potential damage to the shingles (damaged points) (block 410). In typical embodiments, the computer system detects damaged points by comparing each of the shingle point clouds to a model point cloud. The model point cloud generally represents an undamaged shingle, though it may have characteristics consistent with normal wear and tear. Thus, for example, the shingle cloud may be superimposed on the model point cloud and points corresponding to undamaged areas of the shingle will be near one or more points in the model point cloud. Points corresponding to damaged areas of the shingle, on the other hand, will tend to be further away from points in the model point cloud. Consequently, outlier points in each of the shingle point clouds may be identified as damaged points.

After detecting the damaged points by comparing the shingle point clouds to a model point cloud, the computer system may map the damaged points to the property point cloud and identify clusters of damaged points to estimate which areas of the property are damaged (block 415). In some embodiments, the computer system determines which, if any, of the identified clusters represent a false positive. The computer system may also, in certain circumstances, identify an extent or severity of the damage associated with each cluster.

Figure 5:
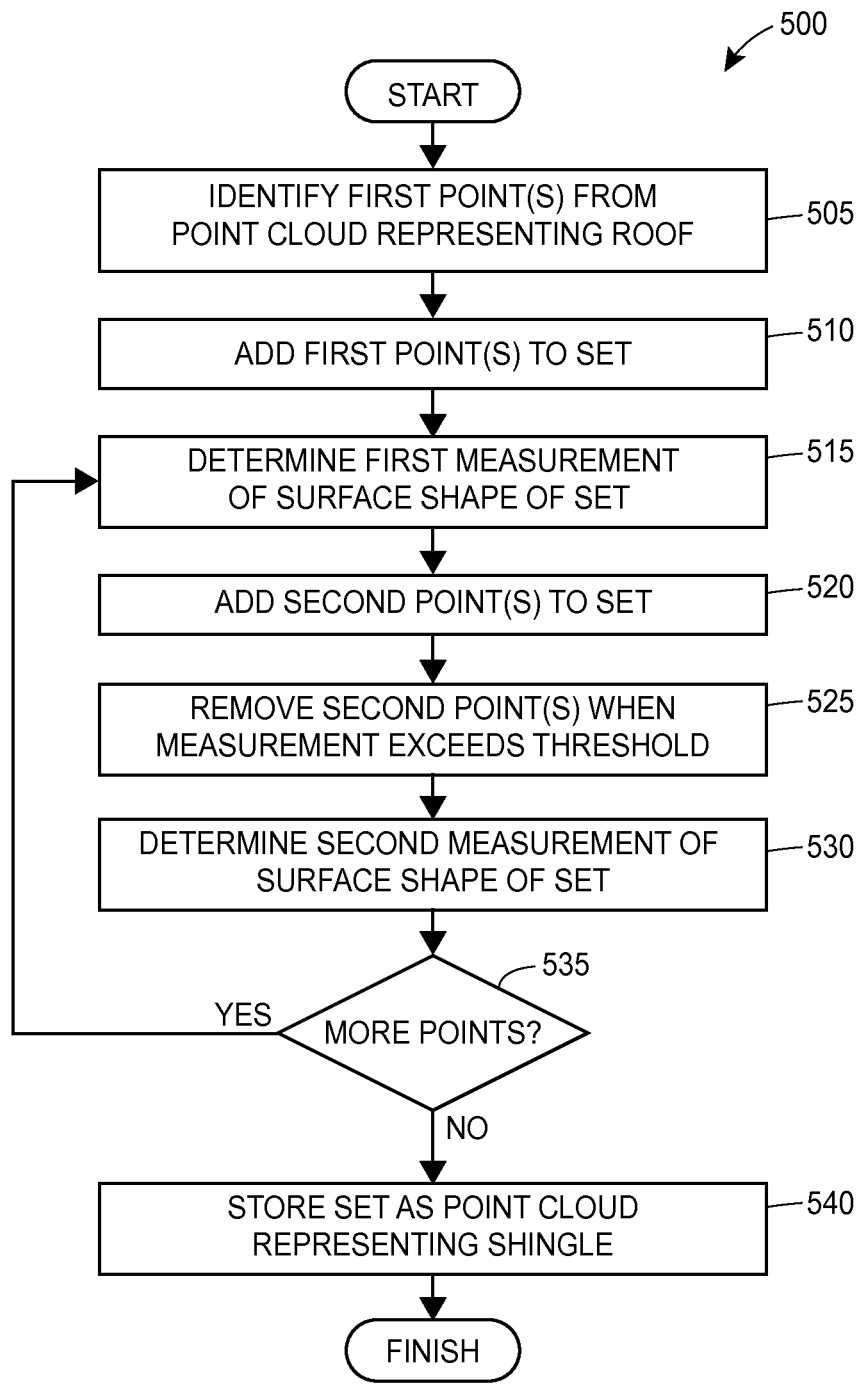
FIG. 5 illustrates a method for identifying individual shingles on a property in accordance with the described embodiments.

FIG. 5 illustrates a method 500 for identifying individual objects (such as shingles, for example) on a property in accordance with the described embodiments. The method 500 may be implemented, in whole or in part, on one or more devices or systems such as the computer system 200 of FIG. 2. The method 500 may be saved as a set of instructions, routines, programs, or modules on memory such as the memory 210 of FIG. 2. In particular, the method 500 may be saved as at least part of the damage assessment module 254 shown in FIG. 2.

The method 500 begins when a computer system identifies a first point from a point cloud representing a property (block 505). In the shown embodiment, the first point is identified from a point cloud representing a roof. In other embodiments, the first point may be identified from a point cloud representing any kind of property, such as a building (e.g., a house, apartment, barn, commercial building, etc.) or a vehicle (e.g., an automobile, aircraft, or watercraft). The computer system adds the first point to a set (block 510). The computer system then calculates a first measurement of the surface shape of the set (block 515). The computer system adds a second (unevaluated) point (i.e., a point not previously added to the set) to the set (block 520) and determines a second measurement of the surface shape of the set (block 525). When the difference between the first and second measurement exceeds a threshold, the second point is removed from the set (block 530).

The computer system may determine whether there are unevaluated points in the point cloud (block 535). If there are points the computer system has not evaluated for adding to the set, the computer system may implement blocks 515-535 with regard to the unevaluated points. If there are no more points to evaluate, the computer system may store the set as a point cloud (i.e., a point cluster or segment) representing a single object (e.g., a shingle) (block 540). In some embodiments, the set may be stored as a point cloud representing a brick, tile, wall panel, wood plank, or any other detectable object on the surface of a property. In some instances, the method 500 may be implemented multiple times to identify multiple objects from the point cloud representing the property.

Figure 6:
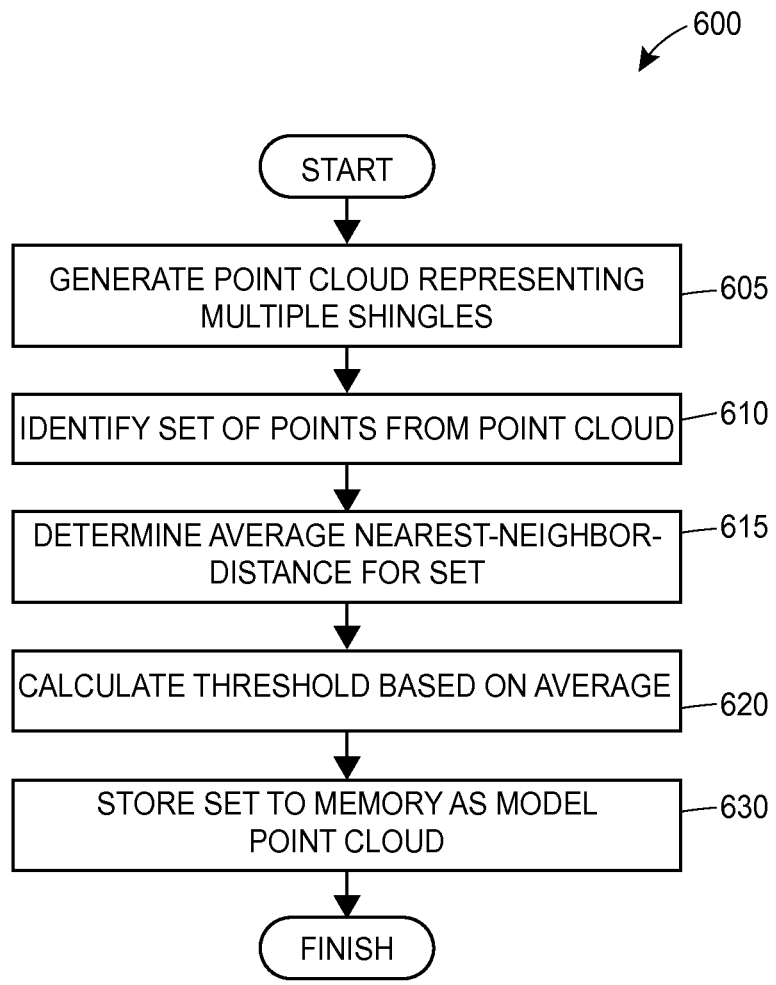
FIG. 6 illustrates an example method for generating a point cloud representing a model point cloud in accordance with the described embodiments.

FIG. 6 illustrates an example method 600 for generating a model point cloud in accordance with the described embodiments. The method 600 may be implemented, in whole or in part, on one or more devices or systems such as the computer system 200 of FIG. 2. The method 600 may be saved as a set of instructions, routines, programs, or modules on memory such as the memory 210 of FIG. 2. In particular, the method 600 may be saved as at least part of the damage assessment module 254 shown in FIG. 2.

The method 600 begins when a computer system generates a point cloud including multiple point clusters (i.e., segments) representing two or more objects (aggregate point cloud) (block 605). In the method displayed in FIG. 6, the objects are shingles, but in other embodiments the objects may be bricks, tiles, side panels, wood planks, or any other type of detectable object on the surface of a property. The computer system identifies and aligns the point clusters in a normalized coordinate system. The point clusters are aligned at one or more reference points, such as along a center point associated with each of the point clusters. The resulting aggregate point cloud includes points from each of the two or more shingle point clouds.

Next, the computer system may select a set of points (block 610). The set of points may be selected by sampling the aggregate point cloud. Alternatively, the set of points may include all of the points from the aggregate point cloud.

The computer system may then determine the mean nearest-neighbor distance for the set of points (block 615). The computer system may also calculate the standard deviation of the squared Euclidean distance of all the points in the set.

The computer system may calculate a threshold based on the mean nearest-neighbor distance for the set of points (block 620). For example, the threshold may be calculated as a scaled number of standard deviations away from the mean. The computer system may save the set of points to a memory as a model point cloud (block 630). After the model point cloud has been created, the point clusters may be compared to the model point cloud. Each point from the model point cloud may be compared, point-by-point, to each of the points in the point clusters. If any point in the model point cloud is farther away from its nearest-neighbor in the point cluster than the predetermined threshold, the point in the model point cloud may be marked as potentially damaged. The points marked as potentially damaged may be mapped back to the original property point cloud.

Figure 7:
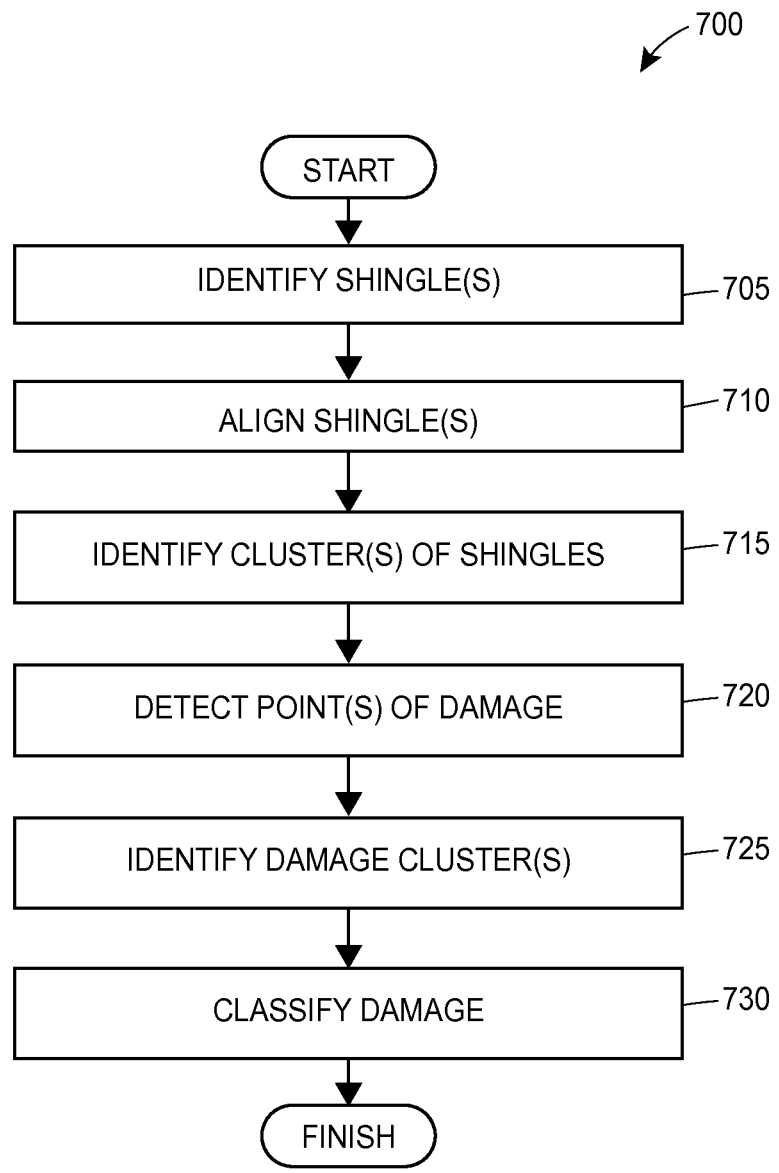
FIG. 7 illustrates an example method for estimating damage to a property in accordance with the described embodiments.

FIG. 7 illustrates an example method 700 for estimating damage to a property in accordance with the described embodiments. The method 700 may be implemented, in whole or in part, on one or more devices or systems such as the computer system 200 of FIG. 2. The method 700 may be saved as a set of instructions, routines, programs, or modules on memory such as the memory 210 of FIG. 2. In particular, the method 700 may be saved as at least part of the damage assessment module 254 shown in FIG. 2.

The method 700 begins when a computer system identifies individual shingles from a point cloud representing a roof or a property with a roof (i.e., the computer system segments the point cloud into single shingle segments) (block 705). This may include generating shingle point clouds corresponding to each shingle. In alternative embodiments the computer system may identify other objects from a point cloud representing a property, such as bricks, tiles, side panels, wood planks, etc.

While some embodiments implement region growing segmentation, the computer system may implement any segmentation method (such as planar segmentation or difference of normals segmentation, for example). Region growing starts by adding a single point or small group of points to a set. Then, the curvature and/or smoothness of the set is calculated. If the smoothness or curvature goes over a specified value, the computer system may remove the added point or small group from the set. This process may occur in an iterative manner, with the computer system adding and removing points depending on how the shape of the set is affected. Eventually, the cluster of points remaining in the set after being added and evaluated represent a single segment or shingle.

The computer system may align all of the segmented shingles to a common alignment (block 710). Alignment may include rotating and translating the property point cloud so that its centroid is located at an origin point of a 3D coordinate system and the property's surface normal is aligned to the z-axis of the 3D coordinate system. The computer system may utilize a number of methods for alignment, including a normal alignment method and an iterative closest point method. Alignment may additionally or alternatively include aligning each of the shingle point clouds. The normal based alignment method causes the computer system to identify the median or average normal of each shingle point cloud. The computer system may then align the centroid of each shingle point cloud to (0,0,0) and align the median normal of each shingle point cloud to the vector facing (0,0,1). In other embodiments, the computer system may use the iterative closest point (ICP) method during alignment.

In some instances, the computer system may identify clusters (i.e., groups) of shingle point clouds (block 715). One of ordinary skill in the art will appreciate that numerous clustering methods may be implemented to identify such clusters or groups, any one of which may be implemented in accordance with block 715. Accordingly, the subsequently described examples serve illustrative purposes and are nonlimiting in nature. For example, the shingle point clouds may be grouped by size and/or shape. The computer system may implement clustering methods such as the k-medoids method to separate the shingles into separate groups. In implementing such a method, selecting the initial cluster centers may be performed by selecting the first medoid uniformly at random. A medoid may be a point in a shingle point cloud whose average dissimilarity to all the points in the shingle point cloud is minimal. In some instances, the medoid of a shingle point cloud is the most centrally located point in the shingle point cloud. The computer system may calculate the difference in the dimensions of the bounding box that encloses the first medoid. The computer system may select the next medoids based on the shingle point clouds that have the largest variance between the initial medoid. This may result in an initial set of medoids that are already separated into bins by their shape and only require a few iterations to converge. In some embodiments, the computer system may implement a k-means method for identifying clusters of shingle point clouds using the "model shingle" as a mean.

The computer system may then detect points corresponding to potentially damaged sections of each shingle (i.e., damage extraction) (block 720). In order to detect said points, a model shingle point cloud representing an undamaged shingle may be created (model). In some instances, the model represents an average of all of the scanned shingles on the property. While damage will vary from shingle to shingle, normal wear and tear will generally be consistent across all shingles. Thus, the significance of most shingle damage will be negligible when creating the model, while wear and tear consistent across the majority of the shingles will generally be accounted for in the model. As discussed in further detail below, the model may be compared to each of the shingle point clouds by comparing the coordinate positions of the points in the model to the coordinate positions of the points in each of the shingle point clouds. Any outlier points in the shingle point clouds (i.e., any point with a nearest-neighbor point in the model shingle that exceeds a certain threshold) may be identified as damaged points or potentially damaged points (damaged points). The damaged points may be mapped to a point cloud, and in particular, to the original property point cloud.

In some embodiments, creating a model shingle point cloud may comprise transforming the shingle point clouds so that the shingles share a common alignment. In one embodiment, the transformation may be implemented using an iterative closest point (ICP) method. The computer system may manipulate two shingle point clouds at a time, continually transforming the two shingle point clouds until either the sum of the distances between the points is lower than a given threshold, or a maximum number of iterations is reached. This ICP method may be implemented with regard to some or all of the shingle point clouds to give the shingle point clouds a common alignment.

The computer system may filter the resulting points using, for example, a voxel grid down sampling of the points. A voxel grid down sampling may create boxes of a specified width and all the points that lie inside one box may be reduced down to their centroid. The computer system may then automatically select a classification threshold for each shingle point cloud by iterating through each of the shingle point clouds and selecting points at random. The computer system may obtain each point's k nearest-neighbors in the model and compute the mean and/or standard deviation of the squared Euclidean distances over the points. The threshold of a shingle point cloud may be selected based on a scaled number of standard deviations away from the mean, where the scaled value is a parameter.

After generating one or more models and/or identifying thresholds for shingle point clouds, the computer system may identify points of potential damage within the shingle point clouds by comparing, point-by-point, one or more points from the model(s) to one or more points from the shingle point cloud(s). In some embodiments, when any point in the model is farther than the specified threshold away from its nearest-neighbor in the shingle point cloud, the point in the model may be marked as damage or potential damage. The computer system may take the points marked as damaged in the model point cloud and map them back to points in the original dataset (i.e., the property point cloud). This mapping back to the original dataset may be advantageous because the points in the model may not represent real points in the shingle. Further, mapping the points to the shingle point cloud may result in losing points along the edge, or may result in damaged segments that may not be included in the shingle point cloud. A method is briefly outlined below (this does not include transforming the clouds to new coordinate frames for comparison):

```
For each region in regionGrownClouds:
    For each point in model:
        neighbor = region.nearestNeighborTo(point)
        distance = neighbor.getDistanceTo(point)
        If (distance > threshold):
            damagePoints.add(point)
    For each point in damagePoints:
        neighbor = dataset.nearestNeighborTo(point)
        damagePoints.add(point)
return damagePoints
```

After detecting damaged points for each shingle, the computer system may segment the damaged points into clusters of points that may be considered a single cluster of damage (i.e., damage segmentation) (block 725). While an isolated single damage point is unlikely to represent a significant physical feature (it may represent a measurement error, for example) and thus unlikely to represent an area of damage to be concerned about, a cluster of damaged points likely represents physical features consistent with a damaged area. Damage segmentation may enable the computer system to use the clusters for classification training. Damage segmentation may be carried out by the computer system using methods such as Euclidean clustering.

Once clusters of damage have been identified, the computer system may reduce the effects of noise in the shingle point clouds by identifying false positives (i.e., clusters that were likely misidentified as damaged regions). The computer system may implement classification methods to identify areas that were wrongly identified as damaged areas. For example, areas near shingle edges may sometimes be wrongly identified as damaged. This may be due to the fact that areas between shingles tend to have more variation in shape and position, making it difficult to identify a baseline for determining whether an area near or on the shingle edge is damaged. Learning models, such as support vector machines (SVM), that recognize patterns may be used to identify false positives.

Figure 8:
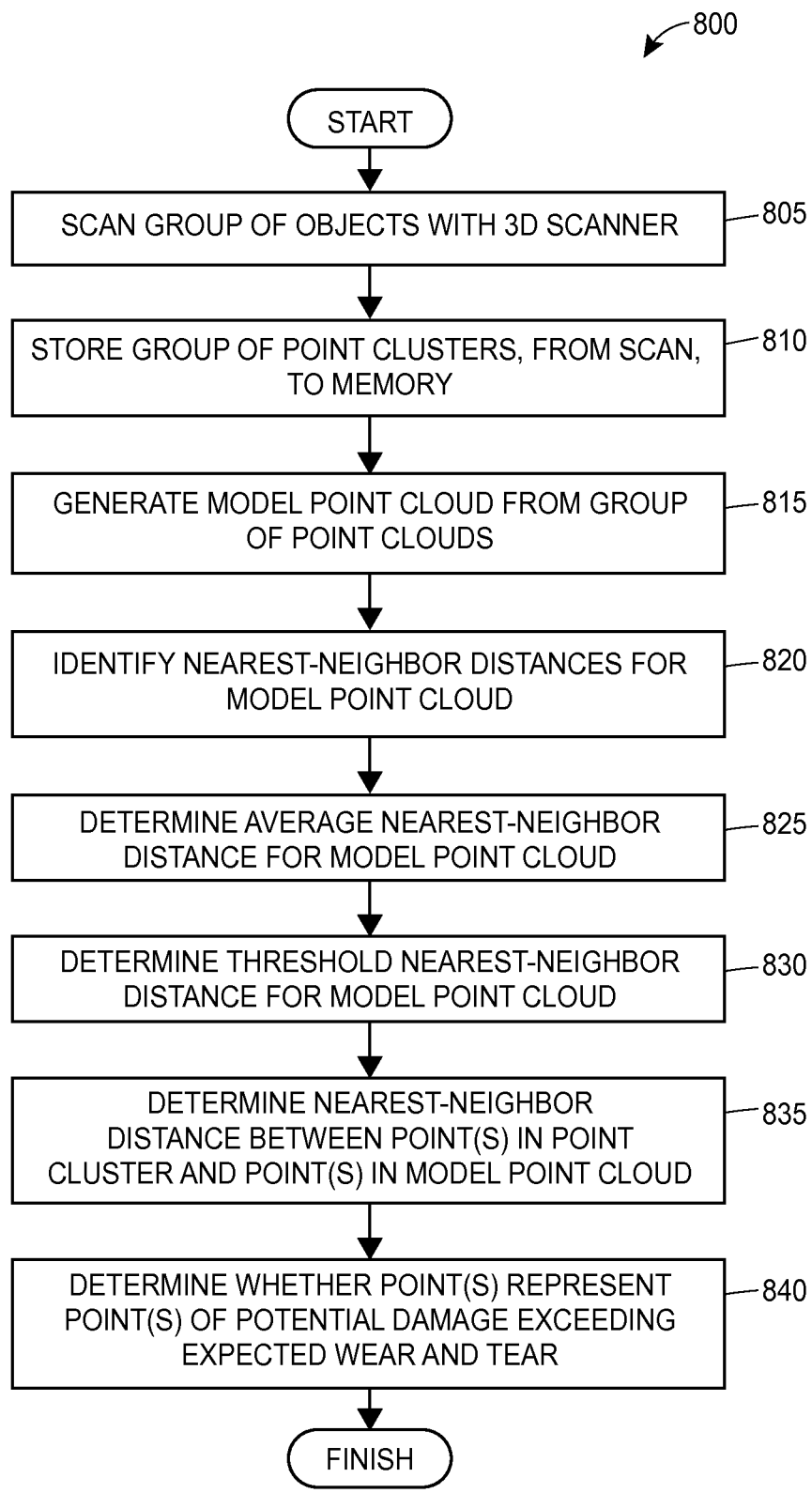
FIG. 8 illustrates an example method for determining whether an object is damaged beyond expected wear and tear in accordance with the described embodiments.

FIG. 8 illustrates an example method 800 for determining whether an object is damaged beyond expected wear and tear in accordance with the described embodiments. The method 800 may be implemented, in whole or in part, on one or more devices or systems such as the computer system 200 of FIG. 2. The method 800 may be saved as a set of instructions, routines, programs, or modules on memory such as the memory 210 shown in FIG. 2. In particular, the method 800 may be saved as at least part of the damage assessment module 254 shown in FIG. 2. In particular, the method 800 may be saved as at least part of the damage assessment module 254 shown in FIG. 2.

The method 800 begins when one or more 3D scanners scan a group of objects (block 805). The one or more 3D scanners generate a group of two or more point clusters corresponding to the scanned group of objects. The scanned objects may be components of a building or a vehicle. For example, the objects may be shingles, tiles, bricks, body panels, etc. In some embodiments, the 3D scanners may generate a single point cloud and the two or more point clusters may be identified from the single point cloud by the computer system. In any event, after scanning the group of objects, the group of point clusters are stored to a memory (block 810).

The computer system may then generate a model point cloud from the group of point clusters (block 815). In some embodiments, the model point cloud may be generated by a second system and subsequently utilized by the computer system. In any event, the model point cloud may be stored to a memory and the computer system may utilize the model point cloud by retrieving the model point cloud from a memory (the memory may be a component of the computer system or may be external to the computer system). For example, the model point cloud may have been previously generated by the computer system and stored to a memory of the computer system, or may have been generated by a second system and transmitted to the computer system to be stored to a memory of the computer system. In another example, the computer system may access a memory of a second system to access the model point cloud.

The computer system may identify a first nearest-neighbor distance between a first and second point in the model point cloud and a second nearest-neighbor distance between a third and fourth point in the model point cloud (block 820). Based on the identified nearest-neighbor distances, the computer system may determine an average nearest-neighbor distance (block 825) and determine a threshold nearest-neighbor distance based on the average nearest-neighbor distance (block 830).

The computer system may then determine a third nearest-neighbor distance between a particular point in the first point cluster and a nearest point in the model point cloud (block 835). When the third nearest-neighbor distance exceeds the threshold nearest-neighbor distance, the computer system may determine that the particular point is an outlier and thus represents a point of potential damage to the first object that exceeds expected wear and tear (block 840). The computer system may then display information indicating that the first object is potentially damaged beyond expected wear and tear.

Additional Considerations

The following additional considerations apply to the foregoing discussion. In some embodiments, the disclosed methods and systems may store, at a database, manually classified damage regions (i.e., classified by a user or estimator as, e.g., hail damage, not damage, fraud, etc.). The systems and methods may rely on the classified regions to help classify new damaged regions.

In some embodiments, the disclosed methods and systems may be used to determine a property needs to be replaced based on the amount of damage showing on the property, using the size and number of dents. Furthermore, the disclosed methods and systems may utilize models that account for different types of property material, shingle size, and amount of wear already on the property. Each of these property parameters may be stored at a database and used to increase the accuracy of property models.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain implementations are described herein as including logic or a number of components, modules, or mechanisms. Modules may constitute either software modules (e.g., code implemented on a tangible, non-transitory machine-readable medium such as RAM, ROM, flash memory of a computer, hard disk drive, optical disk drive, tape drive, etc.) or hardware modules (e.g., an integrated circuit, an application-specific integrated circuit (ASIC), a field programmable logic array (FPLA)/field-programmable gate array (FPGA), etc.). A hardware module is a tangible unit capable of performing certain operations and may be configured or arranged in a certain manner. In example implementations, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one implementation," "one embodiment," "an implementation," or "an embodiment" means that a particular element, feature, structure, or characteristic described in connection with the implementation is included in at least one implementation. The appearances of the phrase "in one implementation" or "in one embodiment" in various places in the specification are not necessarily all referring to the same implementation.

Some implementations may be described using the expression "coupled" along with its derivatives. For example, some implementations may be described using the term "coupled" to indicate that two or more elements are in direct physical or electrical contact. The term "coupled," however, may also mean that two or more elements are not in direct contact with each other, but yet still co-operate or interact with each other. The implementations are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the implementations herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for inspecting a structure to estimate the condition of a structure through the disclosed principles herein. Thus, while particular implementations and applications have been illustrated and described, it is to be understood that the disclosed implementations are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

We claim:

1. A computer implemented method for estimating damage to a property, the method comprising:
   scanning a property with a three dimensional (3D) scanner to generate a 3D point cloud of the scanned property;
   storing the 3D point cloud to a memory device;
   causing one or more processors to access the 3D point cloud stored at the memory device and to implement a damage assessment module for:
      (i) comparing a first segment of the generated 3D point cloud to a model point cloud, the first segment corresponding to a first object of a plurality of objects detectable at a surface of the property;
      (ii) identifying based on the comparison of the first segment to the model point cloud, a set of outlier points from the first segment; and
      (iii) associating the identified set of outlier points with a damage status;
   generating, by said one or more processors and based at least in part on the damage status associated with the set of outlier points, a report of estimated damage to the property; and
   displaying, at a user interface device, the generated report of estimated damage to the scanned property.

2. The method of claim 1, wherein:
   the property is a building; and
   the object is one of a plurality of objects on the surface of the property, the plurality of objects selected from a group consisting of: (i) a plurality of tiles; (ii) a plurality of shingles; (iii) a plurality of bricks; (iv) a plurality of siding panels; and (v) a plurality of wood planks.

3. The method of claim 1, wherein:
   the property is a vehicle; and
   the object is one of a plurality of body panels of the vehicle.

4. The method of claim 1, wherein:
   the first segment corresponds to a point cluster, identified from the 3D point cloud, forming a first planar region.

5. The method of claim 4, further comprising identifying, by said one or more processors, the first segment of the 3D point cloud, wherein identifying the first segment of the 3D point cloud includes utilizing region growing segmentation to isolate, from the 3D point cloud, the point cluster forming the first planar region.

6. The method of claim 5, wherein utilizing region growing segmentation to isolate, from the 3D point cloud, the point cluster forming the first planar region, comprises:
   identifying, by said one or more processors, a set of candidate points, the set of candidate points including one or more first points from the 3D point cloud;
   determining, by said one or more processors, a first measurement of a surface shape associated with the set of candidate points;
   identifying, by said one or more processors, one or more second points from the 3D point cloud;
   adding, by said one or more processors, the one or more second points to the set of candidate points;
   removing, by said one or more processors, the one or more second points from the set of candidate points when a second measurement of a surface shape associated with the set of candidate points exceeds a threshold shape-measurement; and
   storing the set of candidate points to a memory as the first segment.

7. The method of claim 6, wherein the first measurement, the second measurement, and the threshold shape-measurement each relate to at least one of: (i) curvature, or (ii) smoothness.

8. The method of claim 1, wherein the model point cloud includes points identified from each of a plurality of segments of point clouds, the plurality of segments including the first segment.

9. The method of claim 1, wherein the model point cloud represents an average of point clusters corresponding to other objects detectable at a surface of the property.

10. The method of claim 1, wherein identifying, by one or more processors and based on the comparison of the first segment to the model point cloud, the set of outlier points from the first segment includes:
    determining, for each point of the first segment, a deviation measurement representing a deviation relative to a corresponding point in the model point cloud.

11. The method of claim 1, wherein identifying, by said one or more processors, the set of outlier points from the first segment comprises utilizing Euclidean clustering to identify the set of outlier points from the first segment.

12. The method of claim 1, wherein associating, by one or more processors, the identified set of outlier points with the damage status comprises:
    determining, by said one or more processors, whether one or more of the points in the set of outlier points form a cluster of outlier points proximate to each other such that the cluster of outlier points represent an identifiable area of potential damage to the object.

13. The method of claim 1, wherein the damage status represents at least one of: (i) a false positive associated with the identified set of outlier points, the false positive indicating that the set of outlier points represents an undamaged area of the object; or (ii) an extent of damage associated with the identified set of outlier points.

14. The method of claim 1, further including mapping, by said one or more processors, the set of outlier points associated with the damage status to the 3D point cloud representing the property so that one or more areas of damage to the property may be estimated from the 3D point cloud representing the property.

* * * * *